(12) United States Patent
Chowdhury et al.

(10) Patent No.: US 10,805,252 B2
(45) Date of Patent: *Oct. 13, 2020

(54) PRIORITIZING MESSAGES WITHIN A MESSAGE NETWORK

(71) Applicant: Twitter, Inc., San Francisco, CA (US)

(72) Inventors: Abdur Chowdhury, San Francisco, CA (US); Ashish Goel, Palo Alto, CA (US); Ram Ravichandran, Mesa, AZ (US)

(73) Assignee: Twitter, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,081

(22) Filed: Oct. 29, 2018

(65) Prior Publication Data

US 2019/0068540 A1 Feb. 28, 2019

Related U.S. Application Data

(63) Continuation of application No. 15/144,570, filed on May 2, 2016, now Pat. No. 10,116,611, which is a (Continued)

(51) Int. Cl.
*G06F 15/16* (2006.01)
*H04L 12/58* (2006.01)
(Continued)

(52) U.S. Cl.
CPC .......... *H04L 51/26* (2013.01); *H04L 12/6418* (2013.01); *H04L 51/32* (2013.01);
(Continued)

(58) Field of Classification Search
CPC .............................. H04L 51/32; H04L 51/04
See application file for complete search history.

(56) References Cited

U.S. PATENT DOCUMENTS 7,162,522 B2 * 1/2007 Adar ...................... G06Q 30/02
709/224
7,970,827 B1 6/2011 Cumberbatch et al.
(Continued)

OTHER PUBLICATIONS

O'Reilly, "Goodreads vs Twitter: The Benefits of Asymmetric Follow", May 2009, O'Reilly Radar, all pages, http://radar.oreilly.com/2009/05/goodreads-vs-twitterasymmetric-follow.html.
(Continued)

*Primary Examiner* — Hua Fan
(74) *Attorney, Agent, or Firm* — Fish & Richardson P.C.

(57) ABSTRACT

A system and a method are disclosed for recommending electronic messages in a message sharing system. Users can post messages to the message sharing system. These messages from posting users are received by the system and sent to receiving users that have subscribed to the posting users. The receiving users interact with the messages in various ways, such as by sharing the messages with other users. Interaction information is received for each of the electronic messages. The interaction information includes an indication of the number of interactions with the electronic message by receiving users. A score is determined for each electronic message based on the interaction information. Electronic messages are selected for being recommended to a user or a group of users based on the scores. The recommendations are then sent to the users, enabling users to better focus their attention on messages that are likely to be interesting.

20 Claims, 5 Drawing Sheets

Related U.S. Application Data continuation of application No. 12/898,711, filed on Oct. 6, 2010, now Pat. No. 9,356,806.

(51) Int. Cl.
    *H04L 12/64*     (2006.01)
    *H04L 29/08*     (2006.01)

(52) U.S. Cl.
    CPC .............. *H04L 67/22* (2013.01); *H04L 67/26* (2013.01); *H04L 51/04* (2013.01)

(56) References Cited

U.S. PATENT DOCUMENTS

| | | |
|---|---|---|
| 2006/0287876 A1* | 12/2006 | Jedlicka ................. G06Q 10/10 345/441 |
| 2007/0203996 A1 | 8/2007 | Davitz et al. |
| 2008/0045236 A1 | 2/2008 | Nahon et al. |
| 2009/0138565 A1 | 5/2009 | Shiff et al. |
| 2010/0011072 A1* | 1/2010 | Mishchenko .......... G06Q 10/10 709/206 |
| 2010/0169429 A1 | 7/2010 | O'Sullivan et al. |
| 2010/0241699 A1 | 9/2010 | Muthukumarasamy et al. |
| 2011/0113349 A1 | 5/2011 | Kiciman et al. |
| 2011/0145348 A1 | 6/2011 | Benyamin et al. |
| 2011/0153686 A1 | 6/2011 | Campbell et al. |
| 2011/0282949 A1 | 11/2011 | Rivkin |
| 2012/0016858 A1 | 1/2012 | Rat hod |
| 2012/0124073 A1 | 5/2012 | Gross et al. |
| 2012/0124149 A1 | 5/2012 | Gross et al. |
| 2014/0019542 A1 | 1/2014 | Rao et al. |

OTHER PUBLICATIONS

United States Office Action, U.S. Appl. No. 12/898,711, dated Sep. 3, 2015, 16 pages.
United States Office Action, U.S. Appl. No. 12/898,711, dated Mar. 7, 2014, 16 pages.
United States Office Action, U.S. Appl. No. 12/898,711, dated Mar. 15, 2013, 17 pages.

* cited by examiner

PRIORITIZING MESSAGES WITHIN A MESSAGE NETWORK

CROSS REFERENCE TO RELATED APPLICATIONS

This application is a continuation of U.S. application Ser. No. 15/144,570, filed May 2, 2016, which is a continuation of U.S. application Ser. No. 12/898,711, filed Oct. 6, 2010, now Pat. No. 9,356,806, the contents of which are herein incorporated by reference.

BACKGROUND

1. Field of Art

The disclosure generally relates to the field of electronic messages, and more particularly to prioritizing electronic messages, for example, for sharing and recommending electronic messages.

2. Description of the Related Art

There exist many systems for sharing electronic messages among a community of users. Examples of message sharing systems include Internet forums, electronic mailing lists, blogs and microblogs, and social networks. In any of these systems, users may post messages that can be read by other users of the system. For example, in a social networking website, a user may post a message that can be read by other users that are socially networked to the posting user through the website. In some systems, a user can subscribe to the postings of another user (which can be an individual, a company, or some other entity) and subsequently receive some or all of the postings of that user. For example, a user subscribed to another user in a social network may receive all of the postings of that user. A user that subscribes to postings of another user is also referred to as a "subscriber" (or "follower") of that user.

A user may be a subscriber of many other users and may receive many posted messages. These messages may be stored for later retrieval and viewing by the receiving user. For example, the receiving user may periodically login to a website and view messages that were recently posted by those users that the receiving user is subscribing to. In some cases, messages may be delivered to the user as they are posted, for example by sending a short message service (SMS) text message containing each posted message to the user. A user may receive more messages than the user desires to receive or has time to spend reading. Often, receiving users would prefer to see interesting messages rather than having to give equal focus to all messages.

Receiving users can take various actions to try and view interesting messages while limiting uninteresting messages. They can choose to receive messages posted by particular users or messages with particular keywords, for example. However, these actions often result in the user missing many interesting messages while still receiving uninteresting ones. Thus, there in is lacking, inter alia, configurations that present messages to users that the users are likely to find interesting.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium is configured to recommend electronic messages in a message sharing system. Users can post messages to the message sharing system. These messages from posting users are received by the system and sent to receiving users that have subscribed to the posting users. The receiving users interact with the messages in various ways, such as by sharing the messages with other users. Interaction information is received for each of the electronic messages. The interaction information includes an indication of the number of interactions with the electronic message by receiving users. A score is determined for each electronic message based on the interaction information. Electronic messages are selected for being recommended to a user or a group of users based on the scores. The recommendations are then sent to the users, enabling users to better focus their attention on messages that are likely to be interesting.

It is noted that although the discussion herein is in the context of recommendations, the configuration described includes prioritizing messages in a messaging system. This prioritization of messages includes determining what may be of interest for a message stream of a user. The messages in the message stream may include messages based on possible interests. The interests can be determined as described herein and can be represented through an asymmetric graph. An asymmetric graph corresponds to a representation of interest data that is derived from sources such as messages, sending or posting users (those sending messages), recipient or receiving users that subscribe to (or follow/followers) of posting users, click through of links, etc. With an asymmetric graph it does not matter who posts messages, but rather where interests may be found from information within messages without necessarily having to interact directly with sources of the messages.

Figure 1:
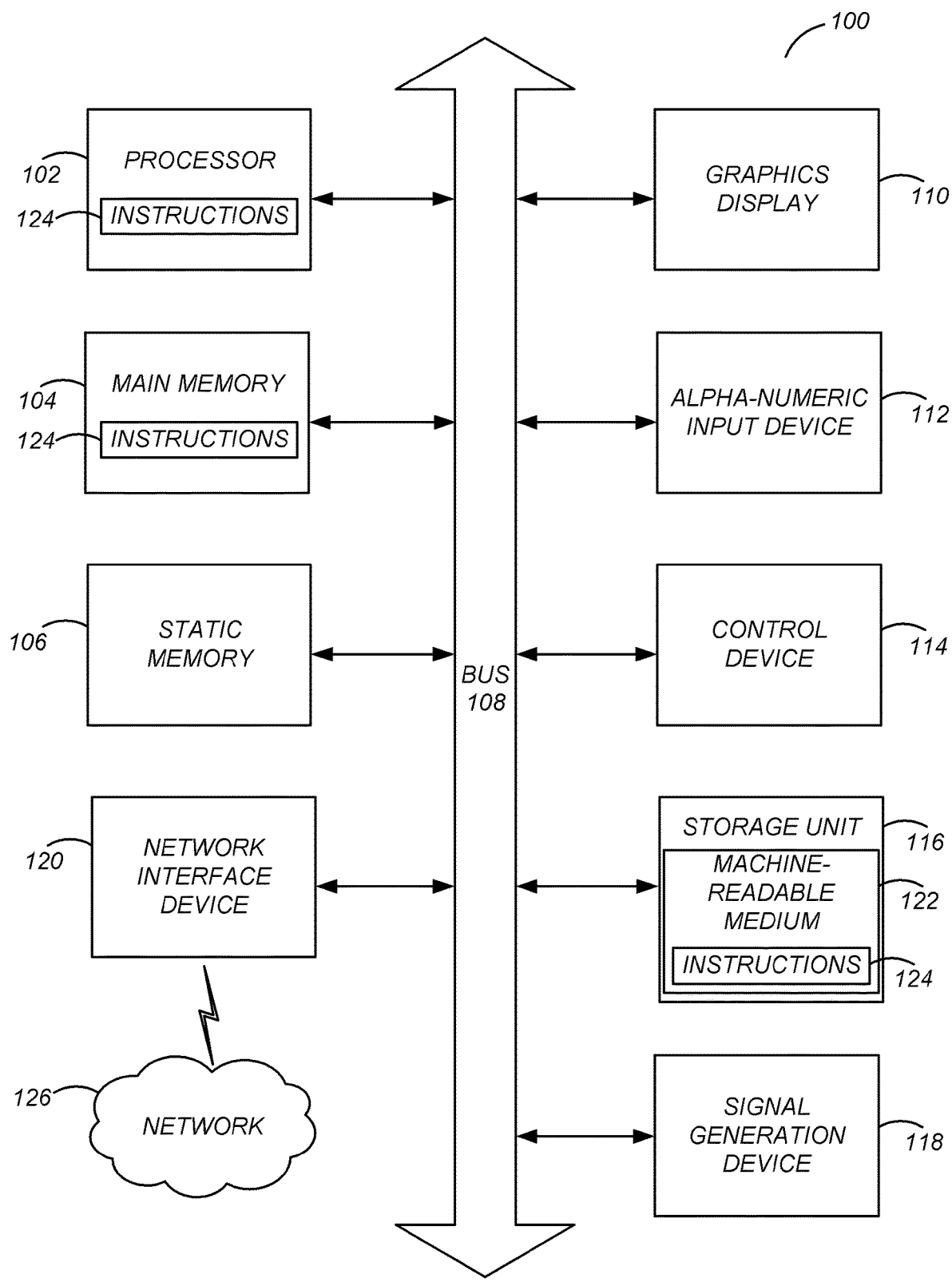
FIG. 1 illustrates one embodiment of components of an example machine able to read instructions from a machine-readable medium and execute them in a processor (or controller).

FIG. 1 is a block diagram illustrating components of an example machine (or computer system) able to read instructions from a machine-readable medium and execute them in a processor (or controller). Specifically, FIG. 1 shows a diagrammatic representation of a machine in the example form of a computer system 100 within which instructions 124 (e.g., software or program code) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a control device 114 (e.g., a mouse, a trackball, a joystick, a motion sensor, or other pointing instrument, or a touchscreen configured with touch and/or gesture sensitive screen manipulation controls), a storage unit 116, a signal generation device 118 (e.g., a speaker), and a network interface device 120, which also are configured to communicate via the bus 108.

The storage unit 116 includes a machine-readable medium 122 on which is stored instructions 124 (e.g., software or program code or program product) embodying any one or more of the methodologies or functions described herein. The instructions 124 may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but is not limited to, data repositories in the form of solid-state memories, optical media, and magnetic media.

Recommendation System

Figure 2:
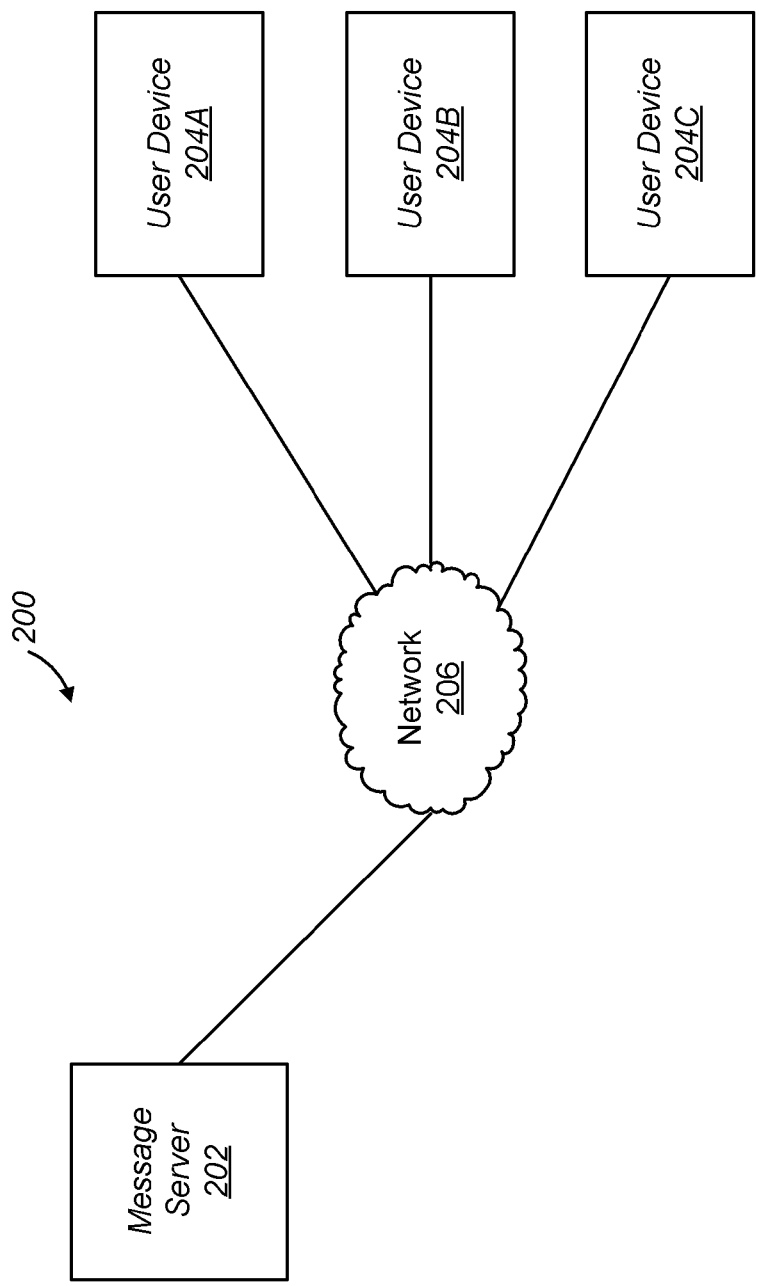
FIG. 2 illustrates one embodiment of a system for recommending messages in a message sharing system.

FIG. 2 illustrates a system 200 for recommending messages in a message sharing system, in one embodiment. Users operate user devices 204A-C (generally 204) that communicates with a message server 202 through network 206. User devices 204 and the message servers comprise a configuration similar to the machine described in FIG. 1. User use their user devices 204 to post messages which are sent to the message server 202. The message server 202 includes a processor, e.g.,102, which processes instructions, e.g.,124 to function as described herein. The message server 202 processes and stores the received messages and sends the messages to user devices of other users. In this way, messages that are posted by one user (e.g., user of user device 204A) are distributed, or shared, to other users (e.g., a user of user device 204B-C). The message server 202 may be any type of computer system 100 that communicates with user devices 204 over the network 206. In one embodiment, the message server 202 receives messages posted from the user devices, stores the messages and also further processes the messages. The message server 202 then transmits (or sends) some or all of the messages to various user devices 204 for display on those devices.

The user devices 204 may be various types of computer systems 100 such as personal computers, mobile (or cellular) phones, or smart phones. In one embodiment, a user enters a message into the user device and then issues a command on the device to send the message to the message server 202 (i.e., to post the message) over the network 206. The message may contain text, images, video, audio, or various other data. In one embodiment, the message is a short message service (SMS) text message. Although only three user devices are shown in FIG. 2, there may be millions of these devices in the system 200. The network 206 may be any electronic communication network or combination of communication networks. Examples include intranets, the Internet, and/or mobile communication (or cellular) networks.

Messages received by the user devices 204 from the message server 202 can be displayed on the respective user device for the user to view. In one embodiment, the first few words of each message are displayed on the user device 204 for the user. The messages may be displayed in a sequence to the user based on the order that they were posted by other users or the order they were received. It is noted that the messages also can be sorted in other contexts such as subject or sender. The message display is referred to as a "stream".

Each user of a user device 204 may have their own message stream. New messages may be periodically added to the end of the currently displayed messages. A receiving user can interact in various ways with messages received from other users. For example, a user may click on a portion of a message shown in the stream to display the full message. As another example, a user may issue a command to share the message with another user. In this case, the share command is sent to the message server which sends the message to the desired other user. Alternately, a user may manually forward a message (e.g., enter in a recipient communications address and forward). When a user interacts with a received message, information about the interaction is sent to the message server.

The message server 202 determines messages that are likely to be interesting for all users, a group of users, or a single user. A group of users may comprise, for example, all users who live in a particular country or who speak a particular language. The determination of interesting messages may be based on various factors such as properties of the message or the message sender, or may be based on the interactions received from other users. The message server may then recommend these messages to the users who would likely find them interesting. This can be done by providing (or triggering) a notification of the interesting messages (e.g., highlighting interesting messages on a display, triggering an audible sound or tone, or triggering a haptic feedback mechanism) sent in the users' streams or by creating new streams of interesting messages to provide users (e.g., a "recommended messages" or "prioritized messages" stream). In one embodiment, users can search for messages from their user devices. In such searches, interesting messages can be listed earlier in the search results than other messages.

Figure 3:
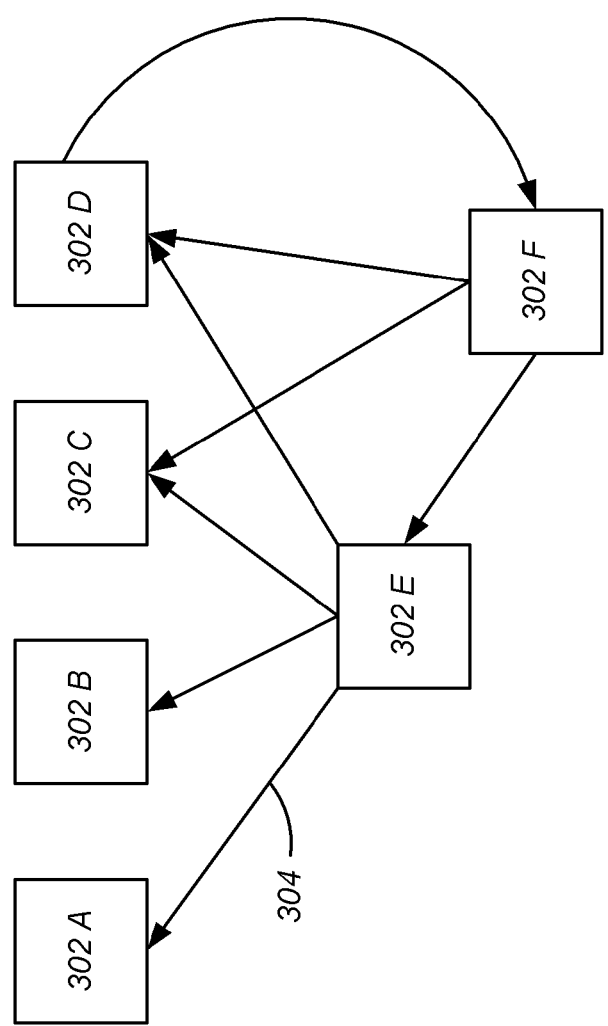
FIG. 3 illustrates one embodiment of a network of users of the message sharing system.

FIG. 3 illustrates a network of users 302 of the message sharing system 200, in one embodiment. Each of the users 302 may have a user device 204 for posting messages and receiving messages. The users are logically connected via connections in the system. The connections may have been initiated by the users based on social connections or perceived interestingness. For example, two connected users may be personal friends. In another example, a user may be connected to another user because the first user thinks that the second user is interesting or famous.

One type of connection is a subscription 304 by one user to another user's messages. Subscriptions 304 are indicated by arrows in FIG. 3. For example, user 302E subscribes to user 302A's messages. This subscription indicates that 302E receives some or all of the messages posted by 302A. User 302E may be a friend of user 302A or otherwise find user 302A to be interesting and expect that messages from user 302A will be interesting. A user may subscribe to multiple other users (e.g., user 302E subscribes to four users). Similarly, a user may have multiple other users subscribing to that user (e.g., user 302C has two subscribers). Some users, such as celebrities, may have thousands or millions of subscribers to the user's messages. This is because a very large number of users may find (or expect to find) the posted messages of celebrities to be interesting.

A user may subscribe to the messages of many (e.g., hundreds of) other users, resulting in the user potentially receiving a large number of messages in the user's message stream. As described below, the message server may recommend messages to the user that most likely interest the user. This may include sending the user additional messages not in the user's message stream. It is noted that alternately a user has a message stream that can be ordered and/or augmented, for example, through a search of messages that return results that are inserted into the message stream based on what are the user's anticipated interests.

Figure 4:
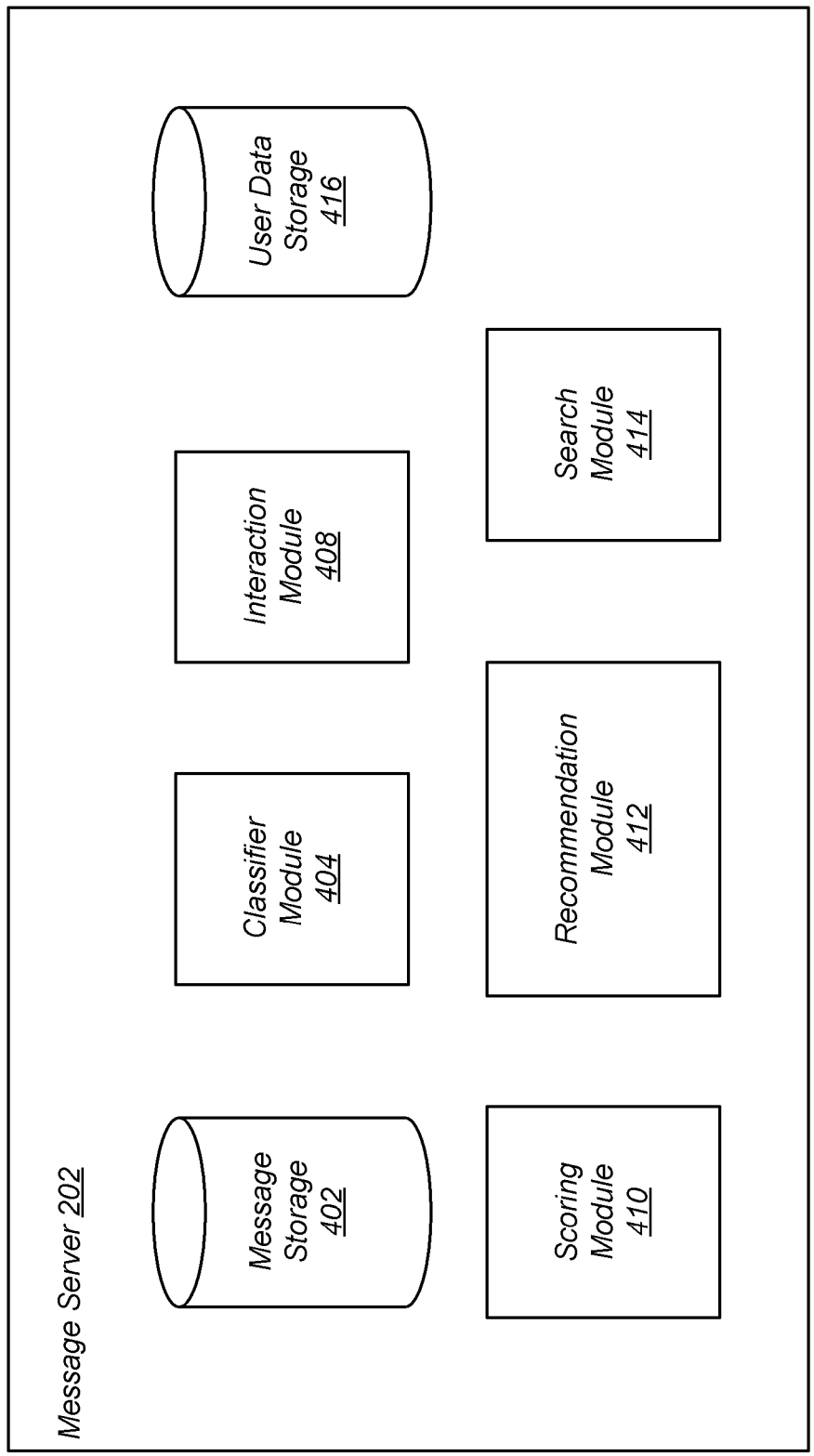
FIG. 4 is a block diagram illustrating one embodiment of a message server.

FIG. 4 is a block diagram illustrating the message server 202, in one embodiment. The message server includes a message store 402, a classifier module 404, an interaction module 408, a scoring module 410, a recommendation module 412, a search module 414, and user data storage 416. The message store 402 stores messages posted by users along with information about the messages, such as various features determined by the classifier module 404 or levels of interaction determined by the interaction module 408. The user data storage 416 stores information about users that post and receive messages, such as connections between users, demographic data about users, and the posting history of users. The classifier module 404 classifies posted messages. Classification may include determining or extracting various features of messages to enable easier further processing of messages. These features may be stored along with the messages in the message store 402.

The interaction module 408 determines the level of interaction and type of interaction by receiving users that is associated with various posted messages. Interactions with messages by receiving users are further discussed below. Interaction information can be stored in the message store 402 with the associated message. The scoring module 410 determines scores associated with posted messages that determine whether the message should be recommended to users. Scores may be determined based on information received from the classifier module and interaction module. The recommendation module 412 determines messages to recommend to users or groups of users. This recommendation can be based on classification data, interaction data, scores, and other factors. The search module 414 handles search queries from users that are searching for messages. The search module may move recommended messages to the top of the search results when presenting them to users.

Recommendation Process

Figure 5:
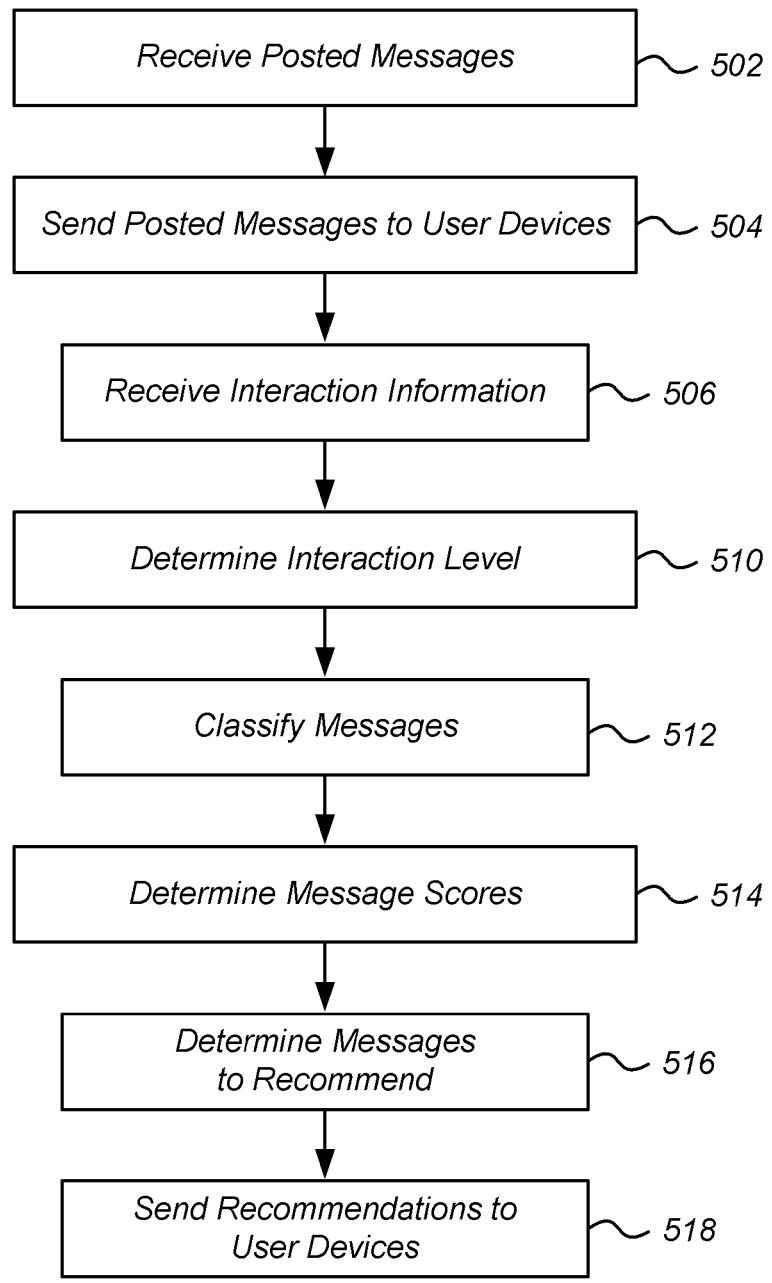
FIG. 5 illustrates one embodiment of a process for recommending messages to users.

FIG. 5 illustrates a process for recommending messages to users, in one embodiment. Initially, users post messages from their user devices as mentioned above. The posted messages are received 502 at the message server 202. The messages are then sent 504 to other user devices 204 based on which users have subscriptions to other users that have posted messages. For example, if a posted message is received from user 302C, the message is then sent to users 302E and 302F. These messages may then be displayed in the users' streams on their user devices 204 and the users may interact with the messages in various ways. Interactions with messages, further described below, indicate users' interest in the messages. A message that many users interact with is likely to be more interesting than a message that very few users interact with.

One type of interaction, mentioned above, is a user selecting a displayed portion of a message in order to read the entire message. In one embodiment, this involves the user selecting (e.g., with a mouse) a portion of a message that is displayed in the user's stream in order to display the entire message. Another type of interaction is a user selecting (e.g., clicking or tapping on) a link contained within a message. Another type of interaction is a user sharing the message with other users. Sharing a message, further described above, involves the user issuing a command to the message server 202 to send the message to other users even if the other users do not subscribe to the poster of the message. A user is likely to share a message with friends if the user finds the message interesting or entertaining. Another type of interaction is a user tagging a message as a "favorite" message. A user may tag a message as a favorite as a way of communicating to other users (or to themselves) that the user found the message interesting. Another type of interaction is a user subscribing to another user upon viewing a message from that user. When a user subscribes to another user based on a message posted by the other user, the message is likely to be interesting. Various other interactions with messages may indicate user interest and can also be tracked. Likewise, still other interactions with messages may indicate a lack of user interest, and these too may be tracked. Examples of interactions corresponding to lack of interest include deletion of a message, blocking further messages from a sender, or unsubscribing from a user.

When a user interacts with a message, the user device 204 of the user may keep track of the interaction (e.g., by storing a record of the interaction locally). The message server 202 may also be aware of some types of interactions, since some interactions (e.g., sharing a message) may involve participation by the message server. The message server 202 may keep track of these interactions. Information regarding an interaction may include the identity of the user that posted the message, the identity of the user that interacted with the message, the type of interaction, and the time of interaction. Interaction information that is tracked by the user devices 204 (e.g., user selection of messages) may be periodically sent from the user devices 204 and received 506 by the message server 202. The interaction information may be sent shortly after each interaction occurs or may be sent less frequently to lower the required processing and network resources. The interaction information can be stored in the message store 402, where all interactions associated with a particular message can be stored along with that message. Interaction information that is older than a specified time period (e.g., 24 hours) may be discarded.

The interaction levels of the messages are then determined 510 from the interaction information. The interaction level of a particular message is an indicator of how much users have interacted with the message. A higher interaction level generally indicates that the message has generated more interest from users and is therefore likely to be of interest to other users. An interaction level for a message can be computed by determining how much the observed interactions with the message deviate from the expected interactions with the message. The expected interactions with the message may be based on the number of subscribers to the messages of the posting user. For example, if a user has 10 subscribers and posts a message, the message is sent to those ten users who have the opportunity to interact with it. If the user had 1,000 subscribers, the posted message would be expected to have more interactions because the message is sent to more users. In cases where the observed number of interactions exceeds the expected number of interactions, a normalized interaction level can be computed as:

$$\text{interaction\_level} = \frac{(\text{observed} - \text{expected})^2}{\text{expected}} \quad (1)$$

where observed is the observed number of interactions with a message, expected is the expected number of interactions with the message (based on the number of subscribers of the posting user), and interaction_level is the normalized interaction level. When the expected number of interactions exceeds the observed number of interactions, the interaction level can be set to zero (0). Alternately, equation (1) can be multiplied by −1 to produce a negative number for the interaction level. The number of observed and expected interactions used to determine the normalized interaction level can be limited to a particular type or types of interaction (e.g., sharing and favoriting, but not clicking).

In one embodiment, the number of expected interactions with a message can be determined based on previous observations of users interacting with posted messages. The number of interactions for various messages posted by users with different numbers of subscribers can be observed and aver ages can be calculated. For example, posts by users with 100 subscribers may be shared by 3 users on average, while posts by users with 1000 subscribers may be shared by 7 users on average. Based on these observations, a function that estimates the number of interactions expected for postings having various numbers of subscribers can be determined (e.g., by fitting a curve to the observations). The expected number of interactions can vary depending on demographic information (e.g., the country of origin of the user posting the message), so different functions can be used for different groups of users. By way of example, one such function is:

$$\text{expected} = 0.049 \, (\text{subscribers})^{0.3677} \quad (2)$$

where subscribers is the number of subscribers to the user who posted the message. This is also the number of users that receive the message and have a chance to interact with it. Equation (2) was determined based on experimentally observed interactions for messages from users having very few subscribers (e.g., 5) to users having many subscribers (e.g., a million). In an alternate embodiment, ranges of numbers of subscribers can be established, and an expected number of interactions can be assigned to each range. Substituting equation (2) into equation (1) yields:

$$\text{interaction\_level} = \frac{(\text{observed} - 0.049(\text{subscribers})^{0.3677})^2}{0.049(\text{subscribers})^{0.3677}} \quad (3)$$

This equation allows for the determination of a normalized interaction level based on an observed number of interactions for a particular message and the number of subscribers to the message (e.g., to the poster of the message). The normalized interaction level can be stored in the message store along with the relevant message and any other information about the message (e.g., number of interactions, number of subscribers, types of interactions, identities of users interacting).

Posted messages are then classified 512. Classification involves determining various properties or features of a message that may be useful indicators of the message's interestingness. Some properties may indicate that a message is interesting to a general group of users while others may indicate that the message is interesting to a specific (or small) group of users.

One type of classification is the length of the message (e.g., the length of text contained in the message). The length of the message can be classified as a number (e.g., 45 characters) or as one of sever al more general categories (e.g., short, medium, or long). When more general categories are used, each category may be within a particular range, for example, short is less than x characters, medium is between x+1 to y−1 characters, and long is y or more characters, where x and y are integer values. The length of a message may indicate how interesting it is likely to be. For example, a very short message (e.g., one word) or a very long message may be less likely to be interesting than a more medium length message. Messages can be classified based on whether they contain a link, such as a Uniform Resource Locator (URL). A message containing a link may be more interesting because it provides an opportunity for a receiving user to learn more about the subject matter discussed in the message.

Messages can be classified based on whether they contain certain categories of terms, such as offensive terms or commercial terms. Offensive terms may make the message less interesting to some users and more interesting to other types of users. Messages that have commercial terms (e.g., "sale" or "discount") may indicate that a message is more likely to be spam and therefore less interesting to most users. Messages may be classified based on properties of the poster (i.e., author) of the message. This classification may include determining the location of the poster (e.g., the city or country) or the age or gender of the poster. Also various metrics describing the poster may be determined. These include the number of subscribers to the poster, the number of other users that the poster subscribes to, the number messages that the poster posts per time period (e.g., per day or per week), and the age of the account (e.g., months since the account was opened). These metrics may indicate the quality, activity level, and connectedness of the poster, which may influence the likely interestingness of the poster's messages.

Messages can be classified by the language of the message (e.g., English, French, etc.). The language may be determined automatically using various automated language assessment tools. A message in a particular language would be of more interest to speakers of the language and of less interest to others. Messages can be classified based on whether or not they are replies to previous messages. A message that is a reply to a previous message may be deemed less interesting than a message concerning a new topic. In one embodiment, messages that are replies may start with a special identifier, such as "@username". Messages can also be classified based on the length of time that has elapsed since the message was posted, where a shorter time may indicate a more interesting message.

Next, scores may be determined 514 for the messages. These scores may be based on the interactions, the calculated normalized interaction level, the classifications, and other factors. Multiple scores may be calculated for a particular message. Different scores may correspond to the expected level of interest of the message for particular groups. For example, a message may have a score that generally applies to all speakers of the language that the message is written in. The message may also have specific scores that apply to users living in the same city as the message poster or scores that apply to users that are connected to the message poster.

A score can be created by assigning values to the various interactions and classification results and combining them using weights for each value. For example, a classification of a message as containing commercial language may result in a value of 0, while a classification of a message as containing no commercial language may result in a value of 1. These values may be weighted (e.g., multiplied) by a factor such as 0.05 and then added to the current score of the message. In this example, a message without commercial language would increase the score by 0.05, indicating that the message has a greater chance of being interesting, while a message with commercial language would not increase the score. Values and weights can be different for different score computations. For example, among a group of people that are looking for items to purchase, a message having commercial language may be given a higher value than other messages, and the assigned weight may be high compared to weights for other classified features.

In one embodiment, the quality of a poster and the poster's connectedness with a particular user or group of users may be a component of the calculated score for that user or group of users. A user that has many subscribers may be deemed to be a higher quality user and may result in the message having a higher score. Similarly a user that has previously posted several messages that have been found to be interesting (either through observed user interaction or through a score as described here) may be considered a higher quality user.

It is noted that in a social networking context, one example of connectedness corresponds with how particular users are linked (or connected) together and may include a measure of connection, e.g., quantity or quality, between them. For example, a user directly connected with another user (e.g., user A directly connected with user B) has a higher degree of connectedness than when a user is indirectly connected with another user (e.g., through a chain of intermediate users that are connected together such as user A connected with user C, who is connected to user B, so that user A is connected to user B through user C). In another example of connectedness, users may be subscribed to a user subscriber list. Users from that subscribed list post messages, and accordingly, would have a higher degree of connectedness with other subscribers on that user subscriber list than subscribers that are not on the list. In yet another example of connectedness, an interaction graph can be referenced to determine how strong a connection is between two users. For example, if one user that posts messages interacts with messages posted by another user (or vice versa), the connection between the two users may be higher than they otherwise would be between the two users.

Information about interactions and the interaction level may also be included in a score for a message. The normalized interaction level mentioned above may be given a weight and included in the message score. Also, information about individual interactions may be separately incorporated into the score. For example, the number of sharing interactions may be determined, and this number multiplied by a particular weight to determine a score component. Similarly, the number of favoriting interactions may be determined and incorporated into the score. Each interaction may be individually weighted based on the identity of the user interacting with the message. An interaction from a higher quality user, as described above, may be weighted more heavily in the score than an average user's interaction with the message.

Any of the types of classification or interactions described above may be used to determine a score for a message. They may be combined in different ways to produce several different scores for the same message for different audiences (e.g., general users vs. users that subscribe to the message posters). Individual weighted values may be combined in various ways. A linear combination involves adding the weighted values and is mentioned above. Nonlinear combinations are also possible. For example, the presence of offensive words in the message may reduce the score to zero for certain populations of readers (e.g., children) regardless of the other components of the score.

In one embodiment, a receiving user can submit customization information to the message server to indicate how messages should be scored. A user may specify that the user is mostly interested in messages that contain links and that have been favorited by the user's connections, for example. This information may be stored in the user data storage 416 and retrieved when determining message scores for that user. Various forms or options can be presented to users to allow users to specify what characteristics of messages or message interactions are important to them, allowing for more customized user recommendations.

In step 516, the message server determines messages to recommend. These determinations are made in part based on the scores discussed above. The determinations may also be based on specific classification or interaction data separate from the score. As mentioned above, when a user posts a message, the message is normally sent to the subscribers of the posting user. This default behavior may cause the receivers to receive many messages that they are not likely to be interested in. They receive the messages merely because they subscribe to the users posting the messages. Also, users may not receive messages that would likely interest them because they have not subscribed to the posting users. Recommendations can alleviate these problems. Various types of recommendations may be made, including highlighting, filtering, and sending additional messages.

In one embodiment, certain messages are highlighted as being likely to be particularly interesting for a user or group of users. Messages having interestingness scores above a threshold value may be flagged as messages to be highlighted for receiving users. Since a message may have multiple scores that apply to different groups of users, a message may be highlighted for certain users but not highlighted for other users. Different users or groups of users may also have different threshold values for highlighting or may set various customizable criteria for highlighting. For example, a user may be able to specify that that messages containing certain words (e.g., offensive words) not be highlighted and that messages that have been favorited by any of the user's connections be highlighted. As a result, a rule-based determination may be made for whether to highlight a message based on classification factors, interaction factors, the calculated normalized interaction score, predetermined thresholds, and user-provided criteria for highlighting.

In one embodiment, certain messages can be filtered from a user's message stream. Messages from users to which a user is subscribed normally appear in the user's message stream, but some of these messages are likely to be uninteresting. These messages may be filtered out so that they do not display in the receiving user's message stream. Filtering can be considered a type of negative recommendation. The process for determining messages to filter is similar to the method described above for determining messages to highlight, except that filtered messages are generally determined to be less interesting than a predefined threshold (e.g., a quantitative threshold such as a numerical value or a qualitative threshold such as high, medium or low). Interaction information, classification information, and interaction scores may be used to determine messages to filter. For example, a message score can be compared to a threshold value, and if the message score is lower than the threshold value then the message is filtered. As mentioned above, a user may specify customizable criteria for filtering, and a rule-based determination for filtering may be made based on classification factors, interaction factors, the calculated normalized interaction score, predetermined thresholds, and user-provided criteria.

In one embodiment, additional messages that are likely to be interesting may be sent to users beyond messages from posters that the user has subscribed to. These additional messages may be sent to a different message stream than the message stream in which a user receives messages from posting users to which the user has subscribed. For example, an additional stream may be provided that includes generally interesting recent posted messages. A user may receive multiple additional streams each having messages that are likely to be interesting to a particular audience. A user may subscribe to these streams in a manner similar to subscribing to posts from another user. Example names of these streams may be "Over all top posts" or "Interesting links". Users may store messages arriving in these streams for later viewing. A message may be sent to users subscribing to one of these streams based on any of the factors discussed above, including classification factors, interaction factors, the calculated normalized interaction score, predetermined thresholds, and user-provided criteria. Each of the various streams may have different criteria for inclusion.

Further, messages that are to be recommended may also incorporate a diversity element. For example, a user's main message stream or in an additional stream may have a diversity criteria applied to help ensure that messages from a single author (user that authors a message) or about a single concept do not dominate the one or more message streams. Accordingly, with an applied diversity criteria, messages that are otherwise rated higher quantitatively or qualitatively may not be recommended over other messages due to a lack of differences between those higher rates messages and other messages already within the message stream.

Recommendations may be applied before messages are sent to a user, e.g., in systems that use server-side rendering. Alternately, recommendations are directly sent 518 to the user devices 204 for client-side rendering. The recommendations may be information indicating which messages to highlight or which messages to filter. Recommendations may also include additional messages to be provided to the users along with an indication of a message stream (e.g., "Over all top posts") in which to display the messages. The user devices can implement the recommendations based on this recommendation information. Highlighting may involve, for example, displaying the message in bold, in a different color foreground or background, in a different font, or may involve displaying an indicator (e.g., a star or stylized text) near or in the message. Highlighting may also involve moving the message higher within the user's message stream (e.g., displayed near the top or even first in the message stream). Filtering may cause the user device to prevent the message from being displayed, or, if the message is already displayed, to no longer display the message. A filtered message may continue to be displayed, but may be moved lower within the user's message stream (e.g., displayed near the bottom or at the bottom in the message stream).

In one embodiment, recommendations are stored in the message store in addition to or instead of being sent to the user devices. This allows a user device to query the message server for recent recommendations, and then download the recommendations when they are needed for presentation to the user.

Various optimizations can be used to limit the number of messages that need to undergo classification, interaction analysis, or other processing. In one embodiment, only messages that have been shared by a user are considered for this processing. Messages that have been shared are likely to be messages that other users may want to see. Limiting candidate messages for recommendation to previously shared messages may be a computationally inexpensive way to limit the number of messages that undergo further analysis. Various other features of messages or interactions may be used for similar limiting purposes.

In one embodiment, messages may be ranked and a ranking may be stored in the message store and/or sent to user devices. A rank of a message may depend on a comparison of a message's overall score, as discussed above, with the overall scores of other recent messages. Message rank may be useful for deciding how (or whether) to display a message. For example, messages with certain top rankings may be highlighted or displayed at the top of a message stream. These messages may be displayed in rank order. A rank threshold may be established for highlighting messages, such as a threshold that limits highlighting to the top 2% of ranked messages.

In one embodiment, users can search for messages. A user may input a search query including criteria such as keywords or date range on a user device 204 to search for messages. In one embodiment, the search query may be sent to the message server and executed against messages in the message store. The interaction information, classification information, scores, and rankings discussed above may be used to generate search results that are likely to be of greater interest to the searching user. Messages that match a search query may be displayed according to their scores or rank order to the user. It is noted that in one example configuration two or three recommendations may be placed and displayed higher in the message queue (e.g., three recommendation are the first three entries displayed in the message queue) followed by most recent messages in the message queue in reverse chronological order regardless of the score of the most recent messages in the message queue.

In addition, classification or interaction information may also be checked to determine the most relevant search results. For example, if a user is searching for messages written in a particular language, the classification information of search results may be examined for the presence of an indication of the desired language.

In one embodiment, portions of the process illustrated in FIG. 5 may be performed in real time or near real time. For example, soon after a message is created, it can be classified and sent to user devices 204. As interaction information is received, the interaction information can be processed, and scores or rankings may be produced. This recent information may be used to update the recommendation status of the message (e.g., whether it should be highlighted). Updates can be performed repeatedly as new interaction data is received, and a score or rank for a particular message may fluctuate up and down over time. This may result in changes in whether and how the message is recommended over time. In one embodiment, only recent interaction data (e.g., interactions in the last hour) are considered for determining actions to take regarding a message.

Although noted as recommendations, the description herein also can be described as prioritizing messages in a messaging system for user, including augmenting and/or insertion of messages based on interests. The interests can be determined as noted herein and can be represented through an asymmetric graph. An asymmetric graph corresponds to a representation of interest data that is derived from sources such as messages, sending or posting users (those sending messages), recipient or receiving users that subscribe to (or follow/followers) of posting users, click through of links, etc. With an asymmetric graph it does not matter who posts, but rather where interests may be found through information in messages without necessarily having to interact directly with sources.

The disclosed embodiments beneficially allow for receiving users to be provided with recommendations of messages that are likely to be interesting to them. By making recommendations based on previous interactions with messages by other users, the likely interestingness of messages can be more accurately estimated. By considering properties of messages, such as a message categorization or connectedness or quality of the posting user, the recommendations can be further improved and customized for different users.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, e.g., as described in FIGS. 2 and 4. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein, e.g., with FIGS. 2, 3, 4, and 5, may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for recommending messages in a message sharing system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system comprising:
   one or more computers and one or more storage devices storing instructions that are operable, when executed by the one or more computers, to cause the one or more computers to perform operations comprising:
   receiving a message authored by a posting user in a social messaging system having a plurality of users, wherein the message is a candidate for presentation to a requesting user who requests a plurality of messages to be provided by the social messaging system;
   obtaining a number of subscribers for the posting user, the number of subscribers for the posting user representing how many users in the social messaging system have subscribed to receive messages from the posting user;
   computing an expected interaction level of subscribers of the posting user for the message according to the number of subscribers for the posting user;
   obtaining observed interaction data for the message, the observed interaction data representing interactions with the message by one or more subscribers of the posting user to whom the message has been presented;
   computing an observed interaction level of subscribers of the posting user based on the observed interaction data for the message;
   computing an interaction level deviation between the observed interaction level of subscribers of the posting user and the expected interaction level of subscribers of the posting user;
   computing a score for the message representing how likely it is that subscribers of the posting user in the social messaging system will interact with the message, the score being based on the computed interaction level deviation between the observed interaction level of subscribers of the posting user and the expected interaction level of subscribers of the posting user;
   ranking the message relative to a plurality of other messages based on the computed score for the message, the plurality of other messages being candidates for presentation to the requesting user; and
   providing one or more highest-ranked messages from among the plurality of other messages and the candidate message, including the candidate message, to a user device for presentation to the requesting user.

2. The system of claim 1, wherein the computing the expected interaction level of subscribers of the posting user for the message according to the number of subscribers for the posting user comprises providing the number of subscribers for the posting user as input to a function that assigns an expected interaction level based on previous observations of other users interacting with messages posted by a plurality of posting users.

3. The system of claim 2, wherein the function defines a plurality of ranges and assigns a respective expected number of interactions to each range of the plurality of ranges.

4. The system of claim 1, wherein the observed interaction data for the message comprises a number of subscribers of the posting user who selected the message after the message was presented.

5. The system of claim 1, wherein the observed interaction data for the message comprises a number of subscribers of the posting user who shared the message after the message was presented.

6. The system of claim 1, wherein the observed interaction data for the message comprises a number of subscribers of the posting user who tagged the message as a favorite after the message was presented.

7. The system of claim 1, wherein computing a score for the message comprises:
applying a first weight to the computed interaction level deviation;
applying a second weight to a particular attribute value of the message; and
computing a weighted sum resulting from applying the first weight to the computed interaction level deviation and applying the second weight to the particular attribute value of the message.

8. The system of claim 7, wherein the particular attribute value of the message is a number of subscribers to the posting user.

9. A computer-implemented method comprising:
receiving a message authored by a posting user in a social messaging system having a plurality of users, wherein the message is a candidate for presentation to a requesting user who requests a plurality of messages to be provided by the social messaging system;
obtaining a number of subscribers for the posting user, the number of subscribers for the posting user representing how many users in the social messaging system have subscribed to receive messages from the posting user;
computing an expected interaction level of subscribers of the posting user for the message according to the number of subscribers for the posting user;
obtaining observed interaction data for the message, the observed interaction data representing interactions with the message by one or more subscribers of the posting user to whom the message has been presented;
computing an observed interaction level of subscribers of the posting user based on the observed interaction data for the message;
computing an interaction level deviation between the observed interaction level of subscribers of the posting user and the expected interaction level of subscribers of the posting user;
computing a score for the message representing how likely it is that subscribers of the posting user in the social messaging system will interact with the message, the score being based on the computed interaction level deviation between the observed interaction level of subscribers of the posting user and the expected interaction level of subscribers of the posting user;
ranking the message relative to a plurality of other messages based on the computed score for the message, the plurality of other messages being candidates for presentation to the requesting user; and
providing one or more highest-ranked messages from among the plurality of other messages and the candidate message, including the candidate message, to a user device for presentation to the requesting user.

10. The method of claim 9, wherein the computing the expected interaction level of subscribers of the posting user for the message according to the number of subscribers for the posting user comprises providing the number of subscribers for the posting user as input to a function that assigns an expected interaction level based on previous observations of other users interacting with messages posted by a plurality of posting users.

11. The method of claim 10, wherein the function defines a plurality of ranges and assigns a respective expected number of interactions to each range of the plurality of ranges.

12. The method of claim 9, wherein the observed interaction data for the message comprises a number of subscribers of the posting user who selected the message after the message was presented.

13. The method of claim 9, wherein the observed interaction data for the message comprises a number of subscribers of the posting user who shared the message after the message was presented.

14. The method of claim 9, wherein the observed interaction data for the message comprises a number of subscribers of the posting user who tagged the message as a favorite after the message was presented.

15. The method of claim 9, wherein computing a score for the message comprises:
applying a first weight to the computed interaction level deviation;
applying a second weight to a particular attribute value of the message; and
computing a weighted sum resulting from applying the first weight to the computed interaction level deviation and applying the second weight to the particular attribute value of the message.

16. The method of claim 15, wherein the particular attribute value of the message is a number of subscribers to the posting user.

17. One or more non-transitory computer storage media encoded with computer program instructions that when executed by one or more computers cause the one or more computers to perform operations comprising:
receiving a message authored by a posting user in a social messaging system having a plurality of users, wherein the message is a candidate for presentation to a requesting user who requests a plurality of messages to be provided by the social messaging system;
obtaining a number of subscribers for the posting user, the number of subscribers for the posting user representing how many users in the social messaging system have subscribed to receive messages from the posting user;
computing an expected interaction level of subscribers of the posting user for the message according to the number of subscribers for the posting user;
obtaining observed interaction data for the message, the observed interaction data representing interactions with the message by one or more subscribers of the posting user to whom the message has been presented;
computing an observed interaction level of subscribers of the posting user based on the observed interaction data for the message;
computing an interaction level deviation between the observed interaction level of subscribers of the posting user and the expected interaction level of subscribers of the posting user;
computing a score for the message representing how likely it is that subscribers of the posting user in the social messaging system will interact with the message, the score being based on the computed interaction level deviation between the observed interaction level of subscribers of the posting user and the expected interaction level of subscribers of the posting user;
ranking the message relative to a plurality of other messages based on the computed score for the message, the plurality of other messages being candidates for presentation to the requesting user; and providing one or more highest-ranked messages from among the plurality of other messages and the candidate message, including the candidate message, to a user device for presentation to the requesting user.

18. The one or more non-transitory computer storage media of claim 17, wherein the computing the expected interaction level of subscribers of the posting user for the message according to the number of subscribers for the posting user comprises providing the number of subscribers for the posting user as input to a function that assigns an expected interaction level based on previous observations of other users interacting with messages posted by a plurality of posting users.

19. The one or more non-transitory computer storage media of claim 18, wherein the function defines a plurality of ranges and assigns a respective expected number of interactions to each range of the plurality of ranges.

20. The one or more non-transitory computer storage media of claim 17, wherein the observed interaction data for the message comprises a number of subscribers of the posting user who selected the message after the message was presented.

\* \* \* \* \*